United States Patent
Kim et al.

(10) Patent No.: US 9,429,771 B2
(45) Date of Patent: Aug. 30, 2016

(54) EYEGLASSES INCLUDING TRANSPARENT DISPLAY AND CONTROLLING METHOD THEREOF

(71) Applicant: Samsung Display Co., Ltd., Yongin (KR)

(72) Inventors: Jung-Hyun Kim, Yongin (KR); Yu-Kyung Kim, Seongnam-si (KR); Su-Zi Kim, Seoul (KR); Chae-Rin Kim, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 218 days.

(21) Appl. No.: 14/074,017

(22) Filed: Nov. 7, 2013

(65) Prior Publication Data
US 2015/0022773 A1 Jan. 22, 2015

(30) Foreign Application Priority Data
Jul. 18, 2013 (KR) .................. 10-2013-0084926

(51) Int. Cl.
| | |
|---|---|
| *G02C 1/00* | (2006.01) |
| *G09G 5/00* | (2006.01) |
| *G02C 7/10* | (2006.01) |
| *G02C 11/00* | (2006.01) |

(52) U.S. Cl.
CPC .............. *G02C 7/101* (2013.01); *G02C 11/10* (2013.01)

(58) Field of Classification Search
CPC .... G09G 5/02; G09G 2360/144; G09G 3/34; G09G 5/14
USPC ...... 345/7, 8, 9; 359/630; 381/381; 351/158, 351/49, 41; 349/13
See application file for complete search history.

(56) References Cited

U.S. PATENT DOCUMENTS

| | | | |
|---|---|---|---|
| 8,184,067 B1 * | 5/2012 | Braun et al. ........................ | 345/7 |
| 8,203,502 B1 | 6/2012 | Chi et al. | |
| 8,217,856 B1 * | 7/2012 | Petrou ................................ | 345/8 |
| 8,744,113 B1 * | 6/2014 | Rickards ......................... | 381/381 |
| 8,907,867 B2 * | 12/2014 | Wong et al. ...................... | 345/8 |

FOREIGN PATENT DOCUMENTS

KR  10-2011-0015276  2/2011

OTHER PUBLICATIONS

Lumus, A Vision Ahead, The Lumus Solution, Disruptive LOE Technology, Published: Unknown, Earliest Retrieval Date: Nov. 23, 2012, www.lumus-optical.com/index.php?option=com_content&task=view&id=5Itemid=8.
A Samsung Prize Winning Gallery (Chameleon Glasses), Published: Nov. 9, 2012, Retrieved: Nov. 6, 2013, http://contest.samsungdisplay.com/page/prize/prize_2012_view15.html.
(Continued)

Primary Examiner — Hung Dang
(74) Attorney, Agent, or Firm — H.C. Park & Associates, PLC (57) ABSTRACT

Exemplary embodiments of the present invention relate to eyeglasses that have a transparent display and a controlling method thereof. The eyeglasses that have a transparent display include a lens unit, a frame unit coupled with the lens unit, and a pair of leg units connected to respective sides of the frame unit, wherein each of the lens unit and the frame unit comprises a transparent display.

20 Claims, 5 Drawing Sheets

(56) References Cited

OTHER PUBLICATIONS

'Digital Bookmark' wins Samsung future display grand prize, Published: Nov. 29, 2012, Retrieved: Nov. 6, 2013, http://www.yonhapnews.co.kr/bulletin/2012/11/29/0200000000AKR20121129043400003.HTML?from=search.

Oriental—How to play smart, Published: Dec. 4, 2012, Retrieved: Nov. 6, 2013, http://howtoplaysmart.tistory.com/34.

Display beyond imagination, Published: Dec. 7, 2012, Retrieved: Nov. 6, 2013, http://blog.samsungdisplay.com/549.

* cited by examiner

EYEGLASSES INCLUDING TRANSPARENT DISPLAY AND CONTROLLING METHOD THEREOF

CROSS REFERENCE TO RELATED APPLICATION

This application claims priority from and the benefit of Korean Patent Application No. 10-2013-0084926, filed on Jul. 18, 2013, in the Korean Intellectual Property Office, which is hereby incorporated by reference for all purposes as if fully set forth herein.

BACKGROUND

1. Field

Exemplary embodiments of the present invention relate to eyeglasses including a transparent display placed on a lens unit and a frame unit of the eyeglasses and a controlling method thereof.

2. Discussion of the Background

A display apparatus refers to an apparatus for displaying an image signal. Such a display apparatus may include all apparatuses that display input image signals, including a TV, a computer monitor, a PDA, and a smart device on which a demand has hugely increased recently.

A high-definition flat panel type display module, such as an organic light-emitting display panel, a liquid crystal display panel, and a plasma display panel, is being used in the display apparatus. Moreover, a transparent display and a flexible display are being developed according to a type of a display.

Generally, eyeglasses are a tool that is placed on the face to correct the eyesight or protect the eyes from the external environment such as wind and sunlight. Recently, eyeglasses have variety of designs and may also have purpose of fashion items.

The above information disclosed in this Background section is only for enhancement of understanding of the background of the invention and therefore it may contain information that does not form any part of the prior art nor what the prior art may suggest to a person of ordinary skill in the art.

SUMMARY

Exemplary embodiments of the present invention provide eyeglasses including a transparent display disposed on a lens unit of the eyeglasses to allow a user to arbitrarily adjust the transmittance of the lens unit.

Exemplary embodiments of the present invention provide eyeglasses including a transparent display disposed on a frame unit of the eyeglasses to allow a user to arbitrarily change the pattern on the frame unit according to a user's setting.

Additional features of the invention will be set forth in the description which follows, and in part will be apparent from the description, or may be learned by practice of the invention.

An exemplary embodiment of the present invention discloses eyeglasses that have a transparent display including; a lens unit, a frame unit coupled with the lens unit, and a pair of leg units connected to respective sides of the frame unit, wherein each of the lens unit and the frame unit comprises a transparent display.

An exemplary embodiment of the present invention discloses a method of controlling eyeglasses that have a transparent display including; receiving a brightness adjusting signal through a touch panel of a brightness adjusting unit, and adjusting the transmittance of a lens unit in response to the brightness adjusting signal.

An exemplary embodiment of the present invention also discloses a method of controlling eyeglasses that have a transparent display, the method including; receiving a control signal for a frame unit of the eyeglasses from an external apparatus through a receiving unit, and controlling a transparent display of the frame unit based on the control signal for the frame unit.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

In the detailed description of the present invention, reference is made to the accompanying drawings illustrating specific embodiments of the present invention. The embodiments are described in detail so that those of ordinary skill in the art carry out the present invention. It should be understood that the various embodiments of the present invention are different from each other, but are not necessarily mutually exclusive. For example, the specific shapes, structures, and characteristics described herein may be modified from one embodiment to another embodiment without departing from the spirit and scope of the present invention. Further, it should be understood that positions or arrangements of individual elements in each embodiment may be modified without departing from the spirit and scope of the present invention. Therefore, the following detailed description should not be construed as being limitative. Thus, the scope of the present invention should be construed to cover the claims and equivalents thereof. Like reference numerals refer to like elements.

As used herein, the term "and/or" includes any and all combinations of one or more of the associated listed items.

Expressions such as "at least one of," when preceding a list of elements, modify the entire list of elements and do not modify the individual elements of the list. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Hereinafter, exemplary embodiments of the present invention will be described in detail with reference to the accompanying drawings.

Figure 1:
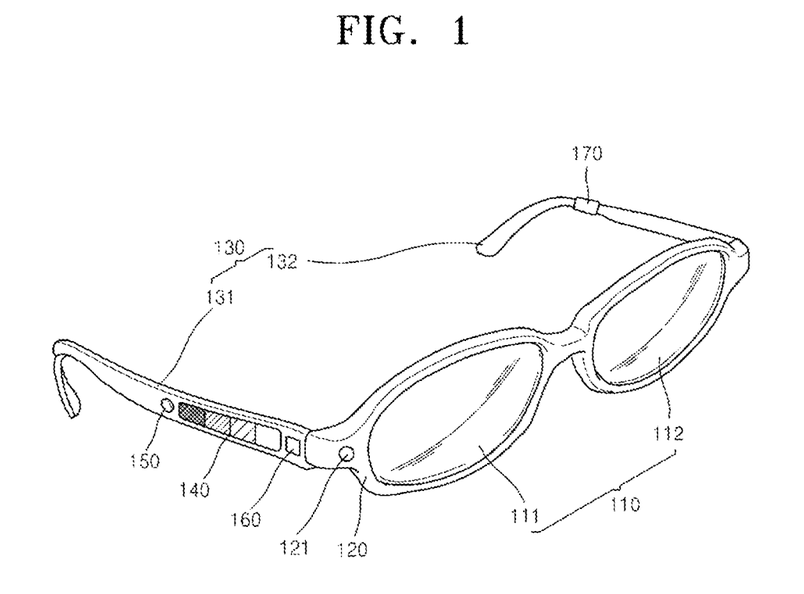
FIG. 1 illustrates eyeglasses that have a transparent display according to an exemplary embodiment.

FIG. 1 illustrates eyeglasses that have a transparent display according to an exemplary embodiment.

Referring to FIG. 1, the eyeglasses that have the transparent display include a lens unit 110, a frame unit 120, and a leg unit 130. The lens unit 110 may include a pair of lenses, a right lens unit 111 and a left lens unit 112. Although FIG. 1 illustrated that the lens unit includes two lenses spaced apart from each other, there may be fewer or more than two lenses. In one exemplary embodiment, the lens unit may be formed of a single integral lens. The frame unit 120 is coupled with the lens unit 110. The leg unit 130 includes a pair of leg units, a right leg unit 131 and a left leg unit 132, connected to the right and left sides of the frame unit 120, respectively.

According to an exemplary embodiment of the present invention, the lens unit 110 and the frame unit 120 may include a transparent display. Alternatively, the lens unit 110 and the frame unit 120 themselves may be transparent displays. The transparent display receives an input signal and displays a desired image, but also allows an external light to pass and lets a user recognize objects behind the transparent display.

The transparent display disposed on the lens unit 110 or the frame unit 120 may be at least one of an electroluminescent (EL) display, a vacuum fluorescent display, a plasma display panel, a liquid crystal display (LCD), a thin film transistor (TFT) LCD, and an organic light-emitting diode (OLED) display. However, the transparent display is not limited thereto, and any display with a transparent characteristic may configure the lens unit 110 or the frame unit 120 of the embodiment.

In an exemplary embodiment, the transparent display may be an OLED display. The transparent display may be configured to be transparent and show objects through the transparent display when the OLED display is in an off state, and display an image when the OLED display is in an on state. Alternatively, even when the OLED display is in the on state, the transparent display may remain transparent and show an object behind the OLED display through the space not occupied by wirings and TFTs patterns or light-emitting regions.

Figure 2:
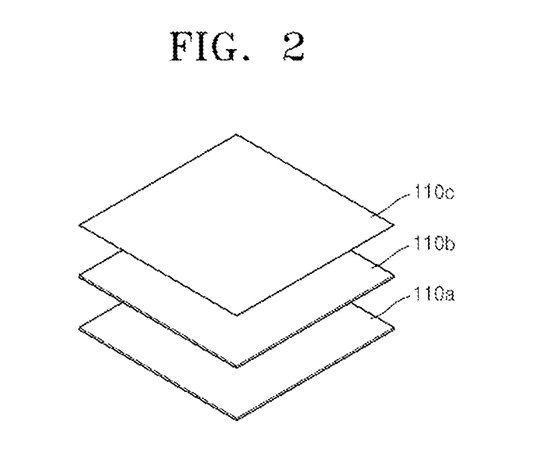
FIG. 2 schematically represents the structure of a lens unit of an exemplary embodiment.

FIG. 2 schematically represents the structure of the lens unit 110 of an exemplary embodiment.

The lens unit 110 of the embodiment may sequentially include a display 110a, a corrective lens 110b, and a protective film 110c. The display 110a has a transparent characteristic as described above. The corrective lens 110b may be configured to correct the eyesight of the user suffering from astigmatism, myopia, and hyperopia. The protective film 110c may protect the display 110a and the corrective lens 110b from external impact. The protection film 110c may also be disposed on the display 110a, or on both the corrective lens 110b and the display 110a.

The structure of the lens unit 110 of FIG. 2 may be equally applied to the frame unit 120, except the corrective lens 110b.

Referring back to FIG. 1, the pair of leg units 130 is respectively connected to both sides of the frame unit 120. The right leg unit 131 is connected to the right side of the frame unit 120 and the left leg unit 132 is connected to the left side thereof. The leg units 130 may be placed on the user's ears to fix the eyeglasses onto the user's face.

The leg unit 130 may further include a brightness adjusting unit 140, a power on/off unit 150, a receiving unit 160, and a sensor unit 170. Although FIG. 1 illustrates that the brightness adjusting unit 140, the power on/off unit 150, and the receiving unit 160 are disposed on the right leg unit 131 and the sensor unit 170 is disposed on the left leg unit 132, they may be disposed on any side of the pair of leg units 130.

According to an exemplary embodiment, the eyeglasses may include a battery (not shown) providing power to the display of the lens unit 110 and frame unit 120. The battery (not shown) may be connected to the power on/off unit 150 or the sensor unit 170.

Figure 3A:
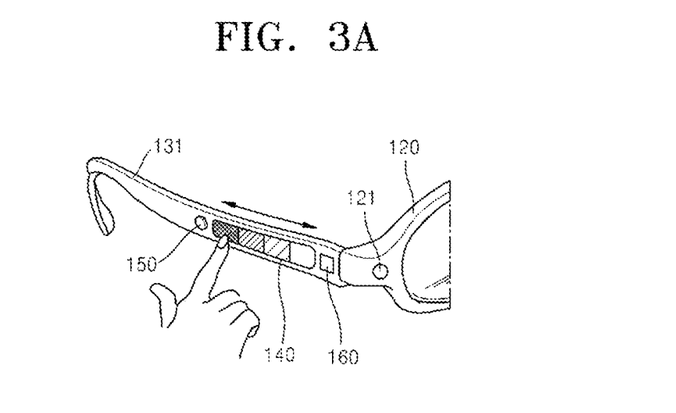
FIGS. 3A and 3B conceptually illustrate a method of adjusting the transmittance of the lens unit using a brightness adjusting unit according to an exemplary embodiment.
Figure 3B:
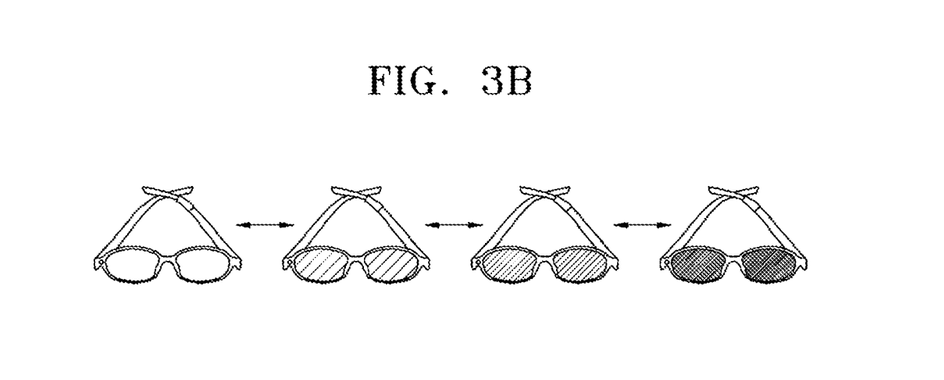

FIGS. 3A and 3B conceptually illustrate a method of adjusting the transmittance of the lens unit 110 using the brightness adjusting unit 140 according to an exemplary embodiment.

Referring to FIG. 3A, the user may adjust the transmittance of the lens unit 110 by touching the brightness adjusting unit 140. The brightness adjusting unit 140 includes a touch panel configured to receive the brightness adjusting signal from the user's touch. In other words, the brightness adjusting unit 140 receives the brightness adjusting signal for the display 110a included in the lens unit 110.

The touch panel of the brightness adjusting unit 140 has divided regions each corresponding to certain transmittance of the lens unit, and the user may adjust the transmittance of the lens unit 110 by touching the corresponding regions of the touch panel. The touch panel may receive the brightness adjusting signal from the user's touch through electrostatic or pressure sensing.

Generally, conventional special purpose eyeglasses with certain level of shadow applied to the lens may not adjust the shadow level of the lens according to the intensity of sunlight. The present exemplary embodiment of the invention is capable of arbitrarily adjusting the shadow of the lens unit 110 by controlling the transmittance of the lens unit 110 including the transparent display.

The user may adjust the transmittance of the lens unit 110 by touching the right or left side of the brightness adjusting unit 140, as illustrated in FIG. 3A. The user may also gradually adjust the transmittance of the lens unit 110 by sliding the touch on the brightness adjusting unit 140 to the right or left side. Referring to FIGS. 1, 3A, and 3B, the color on the touch panel of the brightness adjusting unit 140 may gradually darken from left to right to give the user an intuitive prediction of the adjusted transmittance of the lens unit 110. The user may turn down the transmittance of the lens unit 110 by touching the left side of the touch panel of the brightness adjusting unit 140, and turn up the transmittance of the lens unit 110 by touching the right side of the touch panel of the brightness adjusting unit 140.

FIG. 3B conceptually illustrates an exemplary change in transmittance of the lens unit 110 according to the user's touch on the light adjusting unit 140. The leftmost eyeglasses image of FIG. 3B illustrates the lens unit 110 with no shadow, which may appear when the user touches the rightmost side of the brightness adjusting unit 140. The rightmost eyeglasses image of FIG. 3B illustrates the lens unit 110 with the highest level of shadow, which may appear when the user touches the leftmost side of the brightness adjusting unit 140.

Referring to FIGS. 3A and 3B, when the user slides the touch on the brightness adjusting unit 140 from the right side to the left side, the brightness adjusting unit 140 may gradually change the transmittance of the lens unit 110 from the brightest to the darkest, as illustrated in the FIG. 3B from the leftmost to the rightmost eyeglasses image, in response to the corresponding brightness adjusting signal.

Although FIG. 3B illustrates only four steps of the transmittance of the lens unit 110, there may be fewer or more than four steps. It should be understood that the transmittance of the lens unit 110 may change continuously according to the brightness adjusting signal. The user may arbitrarily adjust the transmittance of the lens unit of the eyeglasses by operating the brightness adjusting unit 140.

Referring back to FIG. 1, the right leg unit 131 includes the power on/off unit 150. A user may control the power on/off unit 150 to turn on or off the transparent displays of the lens unit 110 and the frame unit 120. Since the transparent displays of the lens unit 110 and the frame unit 120 may operate only when the transparent displays are turned on, the power on/off unit 150 may save energy by turning the transparent display off when the user is not using the eyeglasses.

The power on/off unit 150 may be of a button type. When the user presses the button, the transparent display may be turned on and off.

When the transparent display is turned off, the eyeglasses of the present embodiment may have the appearance of conventional eyeglasses. In other words, if the transparent display of the lens unit 110 is turned off, the lens unit 110 is in a transparent state and may become a general lens that transmits external light. When the transparent display of the frame unit 120 is turned off, depending on the setting, the transparent display of the frame unit 120 may either become transparent and transmit the external light, or may maintain opaque and block external light.

The receiving unit 160 receives a control signal for the frame unit 120 from an external device. More specifically, the receiving unit 160 receives a control signal for the transparent display of the frame unit 120 and transmits image data to the transparent display of the frame unit 120.

Figure 4A:
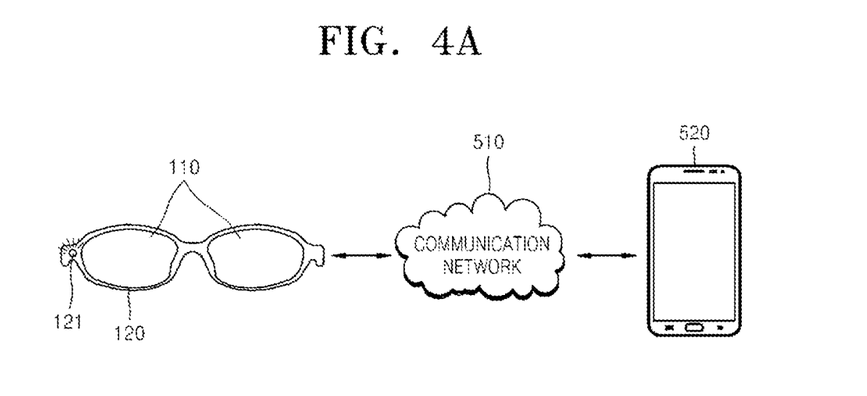
FIGS. 4A and 4B conceptually illustrate a method of controlling an image displayed on a frame unit according to an exemplary embodiment.
Figure 4B:
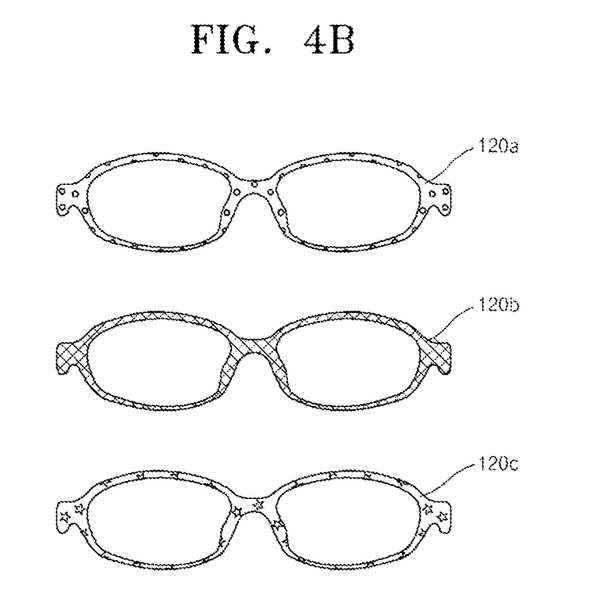

FIGS. 4A and 4B conceptually illustrate a method of controlling an image displayed on the frame unit 120 according to an exemplary embodiment.

FIG. 4A illustrates an exemplary embodiment of how the receiving unit 160 of the eyeglasses communicates with a user terminal 520 through a communication network 510. The user terminal 520 is an exemplary external apparatus that may communicate with the receiving unit 160. The user terminal 520 may generate and transmit image data to be displayed on the frame unit 120. Although the current exemplary embodiment illustrates that the user terminal 520 as a mobile phone, it is not limited thereto. The user terminal 520 may be any external apparatuses that may generate and transmit image data.

The user may utilize an application installed in the user terminal 520 to select image data to be displayed on the frame unit 120. The selected image data may be transmitted to the receiving unit 160 through the communication network 510, and the receiving unit 160 may control the data of the image displayed on the frame unit 120.

The communication network 510 is a network that allows communication between the receiving unit 160 and the user terminal 520, and may include a wireless LAN, Wi-Fi, wireless broadband (Wibro), World Interoperability for Microwave Access (Wimax), High Speed Downlink Packet Access (HSDPA), Long Term Evolution (LTE), IEEE 802.16, Wireless Mobile Broadband Service (WMBS), etc. The communication network 510 may also include a communication technology such as Bluetooth, Radio Frequency Identification (RFID), Infrared Data Association (IrDA), Ultra Wideband (UWB), ZigBee, etc.

The lighting unit 121 included in the frame unit 120 may be turned on to emit light while the receiving unit 160 communicates with the user terminal 520 through the communication network 510. The user may recognize from the light emitting from the lighting unit 121 that the eyeglasses are communicating with the user terminal 520 in working order.

FIG. 4B illustrates exemplary illustration of image data displayed on the frame unit 120. Referring to FIG. 4B, a first image shows a frame unit 120*a* displaying dot-pattern image data, a second image shows a frame unit 120*b* displaying check-pattern image data, and a third image shows a frame unit 120*c* displaying star-pattern image data. User may directly control image data to be displayed on the frame unit 120 by controlling the user terminal 520 and change the style of the eyeglasses without physically replacing the frame of the eyeglasses.

Referring back to FIG. 1, the left leg unit 132 includes the sensor unit 170. However, the sensor unit 170 may be located on either of the leg units 130. The sensor unit 170 is installed on the leg units 130 to sense the relative angle or distance between the leg unit 130 and the frame unit 120 to turn on or off the transparent display of the frame unit 120 and the lens unit 110.

Figure 5A:
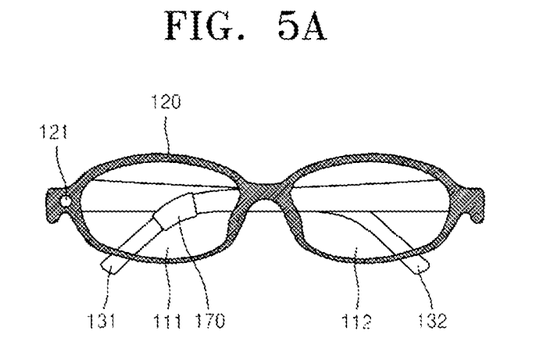
FIGS. 5A and 5B illustrate exemplary embodiments of the lens unit and the frame unit when the leg unit of the eyeglasses is in folded state and open state, respectively.
Figure 5B:
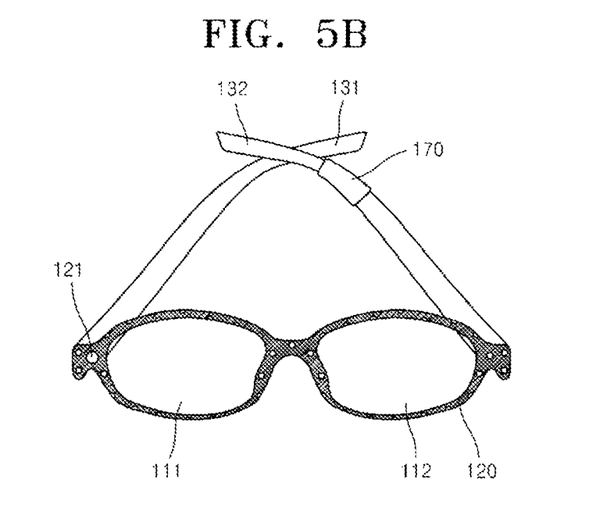

FIGS. 5A and 5B illustrate exemplary embodiments of the transparent display of the lens unit 110 and the frame unit 120 when the leg unit 130 of the eyeglasses is in folded state and open state, respectively.

Referring to FIG. 5A, the sensor unit 170 senses that the leg units 130 is in folded state, based on the relative angle or distance measured from the frame unit 120. Thus, the sensor unit 170 may turn off the transparent displays of the lens unit 110 and the frame unit 120 when the leg units 130 of eyeglasses are in folded state. Since the present exemplary embodiment of the invention uses power to drive the transparent display, power can be saved by turning off the device when the user is not wearing the eyeglasses. The sensor unit 170 may cut off the power supply to the transparent display by sensing the state of the leg unit 130.

Referring to FIG. 5B, when the sensor unit 170 senses that the leg unit 130 is in an open state, it may supply the power to the transparent displays of the lens unit 110 and the frame unit 120. The eyeglasses may display certain image data, such as the dot-pattern image data illustrated in the case of FIG. 5B, on the frame unit 120 while the leg unit 130 of the eyeglasses is in an open state. The value of the relative angle or the relative distance between the leg unit 130 and the frame unit 120 may be arbitrarily set to turn on or off the transparent display.

The sensor unit 170 lets the user turn on or off the transparent display by unfolding or folding the leg unit 130 of the eyeglasses, without manually operating the power on/off unit 150. Although the exemplary embodiment shows that the sensor unit 170 is located on the left leg unit 132, the present invention is not limited thereto. The sensor unit 170 may be located anywhere possible to recognize the state of the leg units 130. The sensor unit 170 may also sense the state of the leg units 130 using methods other than measuring the relative angle or distance between the leg unit 130 and the frame unit 120.

Figure 6:
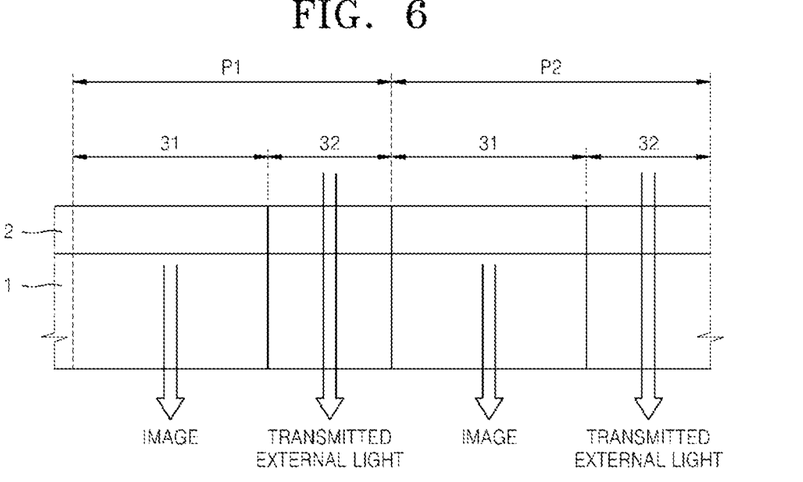
FIG. 6 is a schematic cross-sectional view of a transparent display of a lens unit 110 and a frame unit 120 according to an exemplary embodiment.

FIG. 6 is a schematic cross-sectional view of the transparent display of the lens unit 110 or the frame unit 120 according to an exemplary embodiment.

Referring to FIG. 6, the transparent display according to the exemplary embodiment includes a display unit 2 disposed on a substrate 1.

The substrate 1 may be a low-temperature Polycrystalline silicone (LTPS) substrate, a glass substrate, or a plastic substrate. An external light may enter through the substrate 1 and the display unit 2 of the transparent display.

The display unit 2 allows an external light to pass through, and the display unit 2 allows the user to observe an image on the substrate 1 from the side where an image is presented. Although the exemplary embodiment of FIG. 6 discloses a bottom-emission type display, in which an image on the display unit 2 is presented toward the substrate 1, the present invention is not limited thereto. Present invention may include to a top-emission type, in which the image on the display unit 2 is presented away from the substrate 1.

FIG. 6 shows two adjacent pixels of the transparent display of the embodiment, a first pixel P1 and a second pixel P2. Both of the first and second pixels P1 and P2 each has a first region 31 and a second region 32. An image is displayed on the first region 31 of the display unit 2, and an external light is transmitted through the second region 32.

Both of the first and second pixels P1 and P2 each has the first region 31 to display an image, and the second region 32 to transmit the external light. Therefore, the user may recognize an object through the second region 32 where the external light is transmitted.

In other words, by not forming any display devices such as TFTs, capacitors, and OLEDs in the second regions 32, the transmittance of an external light may be maximized and the distortion of a transmitted image due to the interference with display devices may be minimized.

The transparent display may further include a flexible encapsulation substrate 4 (see, e.g., FIG. 7), disposed on the display unit 2. The transparent display may further include other various protective members disposed on the substrate 1 or the flexible encapsulation substrate 4.

Figure 7:
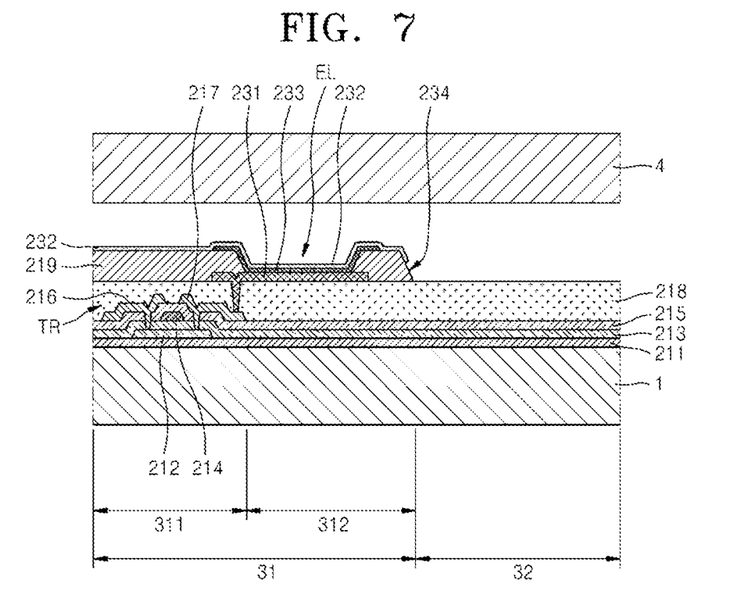
FIG. 7 is a cross-sectional view of an exemplary embodiment of the transparent display of FIG. 6 that is an organic light-emitting display apparatus.

FIG. 7 is a cross-sectional view of an exemplary embodiment of the transparent display of FIG. 6 that is an OLED display.

Referring to FIG. 7, a thin film transistor TR is arranged on a circuit region 311. However, present invention is not limited to one thin film transistor TR arranged, and may include a pixel circuit. The pixel circuit may further include other thin film transistors, a plurality of storage capacitors, and a plurality of wirings, such as scan lines, data lines, and Vdd lines, connected to the thin film transistors and the plurality of storage capacitors.

An electroluminescent (EL) device is arranged on a light-emitting region 312 as a light-emitting device. The EL device is electrically connected to the thin film transistor TR of the pixel circuit.

A buffer layer 211 is disposed on the substrate 1, and the pixel circuit, including the thin film transistor TR, is disposed on the buffer layer 211. The buffer layer 211 may be formed of a transparent insulating material to prevent impure elements from penetrating, and of flatten the surface of the transistor. In one exemplary embodiment, the buffer layer 211 may be made of at least one of: an inorganic material such as silicon oxide, silicon nitride, silicon oxynitride, aluminum oxide, aluminum nitride, titanium oxide, and titanium nitride; an organic material such as polyimide, polyester, and acryl; and a stack thereof.

A semiconductor active layer 212 is disposed on the buffer layer 211. The semiconductor active layer 212 may be made of polycrystalline silicon. However, the embodiment of the present invention is not limited thereto, and the semiconductor active layer 212 may be formed of oxide semiconductor. In one exemplary embodiment, the semiconductor active layer 212 may be an I-G-Z-O layer [(In2O3)a (Ga2O3)b(ZnO)c layer] (where a, b, and c are real numbers, and a≥0, b≥0, and c>0). In current exemplary embodiment, the semiconductor active layer 212 is formed of oxide semiconductor and the light transmittance on the circuit region 311 of the first region 31 may be increased; thus, the external light transmittance of the whole display unit 2 may be increased.

A gate insulating layer 213 is disposed on the buffer layer 211 insulating the semiconductor active layer 212, and a gate electrode 214 is disposed on the gate insulating layer 213.

An interlayer insulating layer 215 is disposed on the gate insulating layer 213 insulating the gate electrode 214, and a source electrode 216 and a drain electrode 217 are disposed on the interlayer insulating layer 215, each electrically connected to the active layer 212 through a contact hole.

The structure of the thin film transistor TR is not limited to the current exemplary embodiment and the thin film transistors may have a variety of different structures.

A passivation layer 218 is disposed insulating the thin film transistor TR. The passivation layer 218 may be a single or a plurality of insulating layers with the top surface flattened. The passivation layer 218 may be formed of an inorganic material and/or an organic material.

As shown in FIG. 7, a first electrode 231 of the EL is disposed on the passivation layer 218, electrically connected to the thin film transistor TR. The first electrode 231 is formed in an independent island form for each pixel.

An insulating layer 219 formed of an organic and/or inorganic insulating material is formed on the passivation layer 218. The insulating layer 219 insulates the edge of the first electrode 231, exposing the central thereof. The insulating layer 219 may cover the first region 31, but not necessarily the whole first region 31, as long as it insulates the edge of the first electrode 231.

An organic layer 233 is disposed on the first electrode 231. A second electrode 232 is disposed on the organic layer 233 covering the organic layer 233 and the insulating layer 219. The second electrode 232 is electrically connected to all the pixels.

The organic layer 233 may be formed of a small molecular organic layer or a macro molecular organic layer. When the organic layer 233 is formed of the small molecular organic layer, the structure may be a single or composite structure of layer stack including a hole injection layer (HIL), a hole transport layer (HTL), an emission layer (EML), an electron transport layer (ETL), an electron injection layer (EIL), etc., and an organic material may include copper phthalocyanine (CuPc), N,N'-Di(naphthalene-1-yl)-N,N'-diphenyl-benzidine (NPB), tris-8-hydroxyquinoline aluminum (Alq3), etc. The HIL, the HTL, the EML, the ETL, and the EIL are common layers and may be commonly applied to red, green, and blue pixels. The small molecular organic layer may be formed by vacuum deposition.

The first electrode 231 may function as an anode electrode, and the second electrode 232 may function as a cathode electrode. The polarities of the first electrode 231 and the second electrode 232 may be reversed.

According to an exemplary embodiment, the first electrode 231 may be a transparent electrode, and the second electrode 232 may be a reflective electrode. The first electrode 231 may include ITO, IZO, ZnO, or In2O3 with a high work function. The second electrode 232 may include metal with a small work function, such as Ag, Mg, Al, Pt, Pd, Au, Ni, Nd, Ir, Cr, Li, or Ca. In current exemplary embodiment, the EL device becomes a bottom emission type device in which an image is displayed toward the first electrode 231.

However, the present invention is not limited thereto, and the second electrode 232 may also be a transparent electrode. The passivation layer 218, the gate insulating layer 213, the interlayer insulating layer 215, and the insulating layer 219 may be formed as a transparent insulating layer.

A flexible encapsulation substrate 4 may be disposed on the second electrode 232 as a sealing structure for the display unit 2. The flexible encapsulation substrate 4 may be bonded to the substrate 1 by a sealant on the edge of the display unit 2 to seal the display unit 2 from external environment. A separate filler may be filled in the sealed area between the flexible encapsulation substrate 4 and the second electrode 232. A moisture absorbent may also be included in the sealed area. The flexible encapsulation substrate 4 may be formed of the same material forming the substrate 1, or may be formed of a plurality of inorganic layers or a combined structure of an inorganic layer and an organic layer. The sealing structure for the display unit 2 is not limited to the flexible encapsulation substrate 4, and may also include a film-type sealing structure.

A transmissive window 234 may be further disposed on the second electrode 232 and the insulating layer 219. The transmissive window 234 may be disposed only on the second electrode 232 or may be further disposed on at least one of the passivation layer 218, the interlayer insulating layer 215, the gate insulating layer 213, and the buffer layer 211.

Specific executions described herein are merely examples and do not limit the scope of the present invention in any way. For simplicity of description, other functional aspects of conventional electronic configurations, control systems, software and the systems may be omitted. Furthermore, line connections or connection members between elements depicted in the drawings represent functional connections and/or physical or circuit connections by way of example, and in actual applications, they may be replaced or embodied as various additional functional connections, physical connections, or circuit connections. In addition, the described elements may not be inevitably required elements for the application of the present invention unless they are specifically mentioned as being "essential" or "critical".

The singular forms "a", "an", and "the" in the present disclosure, in particular, the claims, may be intended to include the plural forms as well. Unless otherwise defined, the ranges defined herein are intended to include any invention to which values within the range are individually applied and may be considered to be the same as individual values constituting the range in the detailed description of the present invention. Lastly, operations constituting the method of the present invention may be performed in appropriate order unless explicitly described in terms of order or described to the contrary. The present invention is not necessarily limited to the order of operations given in the description. The examples or exemplary terms (for example, etc.) used herein are to merely describe the present invention in detail and not intended to limit the present invention unless defined by the following claims. Furthermore, those of ordinary skill in the art will readily appreciate that many alternations, combinations, and modifications, may be made according to design conditions and factors within the scope of the appended claims and their equivalents.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. Eyeglasses comprising a transparent display, the eyeglasses comprising:
    a lens unit;
    a frame unit coupled with the lens unit; and
    a pair of leg units connected to respective sides of the frame unit,
    wherein each of the lens unit and the frame unit comprises a transparent display.

2. The eyeglasses of claim 1, further comprising a brightness adjusting unit that comprises a touch panel disposed on one of the leg units, the brightness adjusting unit being configured to receive a brightness adjusting signal of the lens unit through the touch panel.

3. The eyeglasses of claim 2, wherein the brightness adjusting unit is configured to control a transmittance of the lens unit in response to the brightness adjusting signal detected on the touch panel.

4. The eyeglasses of claim 2, wherein the lens unit comprises a left lens unit and a right lens unit, the brightness adjusting unit is disposed on each of the leg units, the brightness adjusting unit disposed on a left leg unit of the pair of leg units is configured to control a transmittance of the left lens unit, and the brightness adjusting unit disposed on a right leg unit of the pair of leg units is configured to control a transmittance of the right lens unit.

5. The eyeglasses of claim 1, further comprising an on/off unit disposed on one of the leg units, wherein the on/off unit is configured to turn on or off the transparent displays.

6. The eyeglasses of claim 1, further comprising a receiving unit, wherein the receiving unit is configured to receive a control signal for the frame unit from an external apparatus.

7. The eyeglasses of claim 6, wherein the receiving unit is configured to receive image data to be displayed on the frame unit.

8. The eyeglasses of claim 6, wherein the frame unit further comprises a lighting unit, the lighting unit being configured to emit light when the receiving unit communicates with the external apparatus.

9. The eyeglasses of claim 1, further comprising a sensor unit configured to sense at least one of an angle and a distance between one leg unit of the pair of the leg units and the frame unit.

10. The eyeglasses of claim 9, wherein the sensor unit is disposed on one leg unit of the pair of the leg units, and is configured to turn on or off the frame unit or the lens unit depending on the angle or the distance between one leg unit of the pair of leg units and the frame unit.

11. The eyeglasses of claim 1, wherein the lens unit comprises the transparent display, a lens layer, and a protective layer.

12. A method of controlling eyeglasses comprising a transparent display, the method comprising:
    receiving a brightness adjusting signal through a touch panel of a brightness adjusting unit; and
    adjusting a transmittance of a lens unit comprising a transparent display in response to the brightness adjusting signal to uniformly darken or lighten the lens unit.

13. The method of claim 12, wherein receiving the brightness adjusting signal is received through a transparent touch panel of the brightness adjusting unit.

14. The method of claim 12, wherein receiving the brightness adjusting signal comprises detecting a sliding gesture on the touch panel.

15. The method of claim 12, wherein a transmittance of a left lens of the lens unit is adjusted according to a signal received through a unit on a first leg, and a transmittance of a right lens of the lens unit is adjusted according to a signal received through a unit on a second leg.

16. The method of claim 12, further comprising:
   turning off the transparent display in response to detecting that the eyeglasses are in a folded state.

17. A method of controlling eyeglasses comprising a transparent display, the method comprising:
   receiving a control signal for a frame unit of the eyeglasses from an external apparatus through a receiving unit; and
   controlling a transparent display of the frame unit based on the control signal for the frame unit.

18. The method of claim 17, wherein the receiving a control signal further comprises receiving an image data to be displayed on the frame unit.

19. The method of claim 16, wherein the controlling a transparent display further comprises displaying the image data on the transparent display of the frame unit.

20. The method of claim 17, wherein the receiving a control signal further comprises emitting light from a lighting unit when the receiving unit communicates with the external apparatus.

* * * * *